Nov. 28, 1939.  H. R. FITZGERALD  2,181,757
SERVOMOTOR FOR VEHICLE BRAKES
Filed June 13, 1936  2 Sheets-Sheet 2
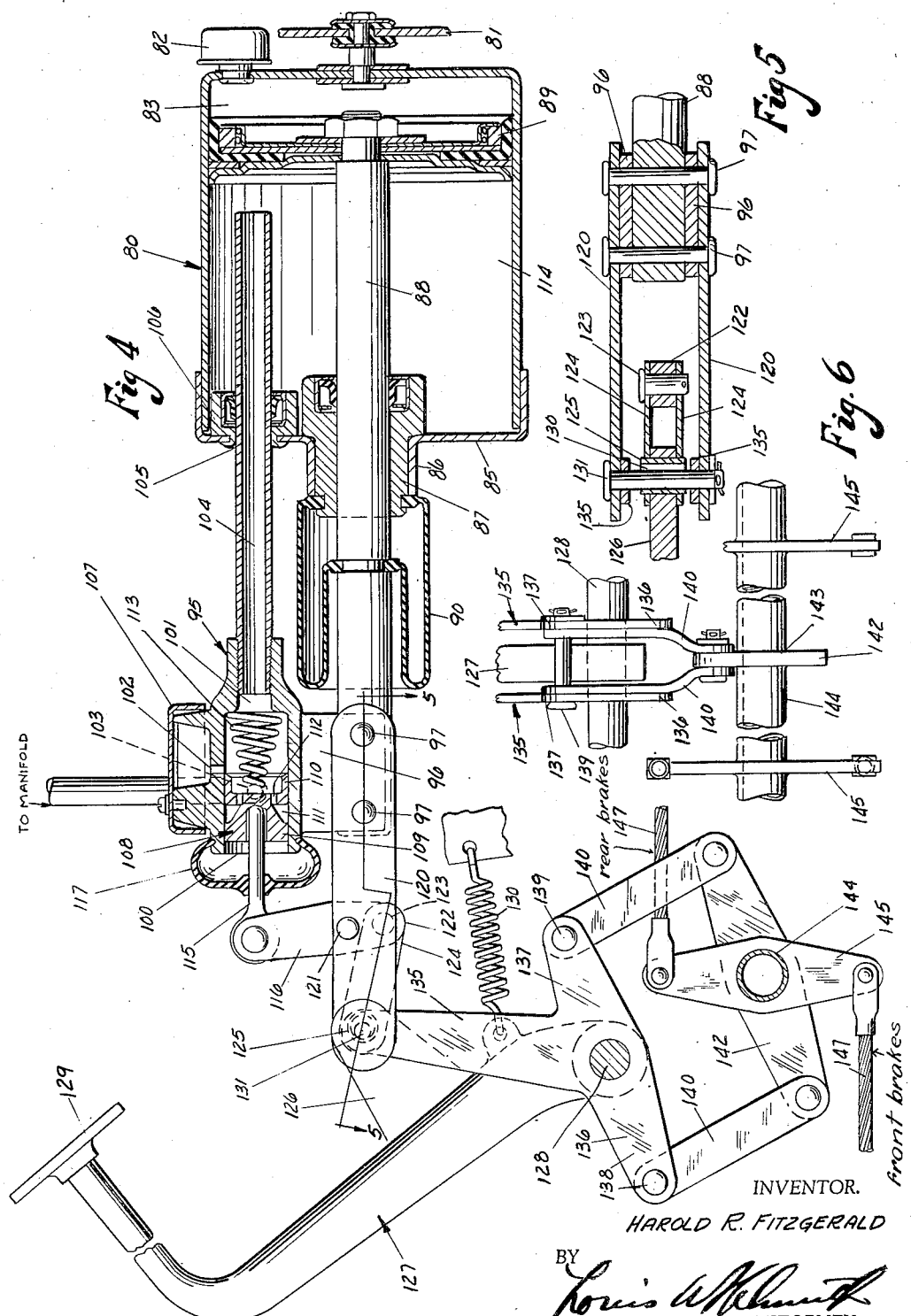
INVENTOR.
HAROLD R. FITZGERALD
BY
ATTORNEY.

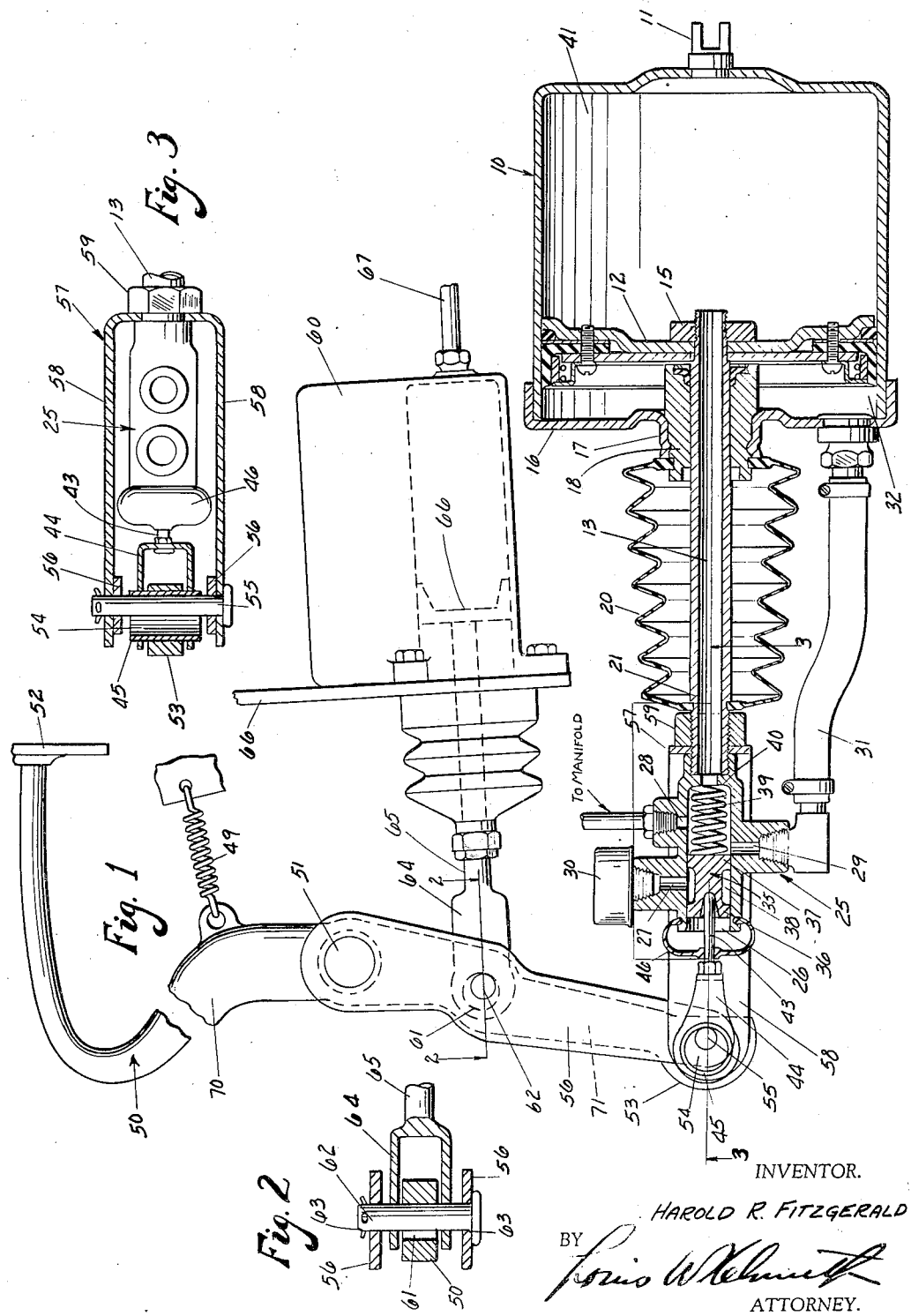

Patented Nov. 28, 1939

2,181,757

UNITED STATES PATENT OFFICE 2,181,757

SERVOMOTOR FOR VEHICLE BRAKES

Harold R. Fitzgerald, Rocky River, Ohio, assignor to The Midland Steel Products Company, Cleveland, Ohio, a corporation of Ohio Application June 13, 1936, Serial No. 85,131

2 Claims. (Cl. 121—41)

This invention relates to new and useful improvements in vehicle brakes and an object of the invention is to provide a brake system including hydraulic brakes actuated either manually or by means of a vacuum effect derived from the power plant of the vehicle.

Another object of the invention is to provide a rigid conduit connected to the control valve and slidable within the power cylinder for conveying the brake actuating fluid to the power cylinder to thereby eliminate the use of flexible rubber conduits between the control valve and power cylinder.

A further object of the invention is to provide a simple and compact leverage arrangement between the power cylinder and the brake applying means.

Other objects and advantages of the invention will become apparent during the course of the following description.

In the accompanying drawings forming a part of the description and wherein like numerals are employed to designate like parts throughout the several views, Fig. 1 is a sectional view partly in elevation of a brake system for actuating hydraulic brakes either manually or by means of vacuum, Fig. 2 is a sectional view taken along the line 2—2 of Fig. 1, Fig. 3 is a sectional view taken along the line 3—3 of Fig. 1, Fig. 4 is a sectional view partly in elevation of a brake system for actuating mechanical brakes either manually or by means of the effect of vacuum, Fig. 5 is a sectional view corresponding to the line 5—5 of Fig. 4, and Fig. 6 is a broken elevational view showing the connection of the power lever means and brake pedal lever to the brake cross shaft.

Referring to Figs. 1 through 3, the numeral 10 designates a vacuum suspended power cylinder suitably supported on the vehicle frame by means of a bracket 11, and reciprocally mounted in the power cylinder is a piston 12 provided with a centrally disposed aperture for the reception of the rear end of a tubular piston rod 13 rigidly secured to the piston 12 by means of a nut 15. The front wall 16 of the power cylinder is punched out to provide a hollow boss 17 for the rigid reception of a packing and bearing member 18 extending a substantial distance into the power cylinder, and which slidably receives the tubular piston rod 13 in substantially fluid tight engagement. A flexible boot 20 is attached to the bearing member 18 and to the forward end 21 of the piston rod 13 to further prevent the passage of air between the packing 18 and the piston rod 13.

The forward end of the tubular piston rod 13 is rigidly secured to a control valve 25 comprising a valve housing having an axial bore 26 communicating with the tubular piston rod 13, and with lateral ports 27, 28 and 29. The port 27 communicates with the atmosphere through a breather or air cleaner 30, and the port 28 is adapted to be connected with the intake manifold of an internal combustion engine for the source of suction or partial vacuum, while the port 29 is connected by means of a flexible conduit 31 to the forward end 32 of the power cylinder 10.

Reciprocally mounted in the valve bore 26 is a piston type valve 35 having spaced apart annular closures or valve members 36 and 37 which define an annular recess 38 of sufficient length to at all times span the atmosphere port 27. A spring 39 is interposed between the end of the valve 35 and a shoulder 40 formed by a reduced portion of the bore 26, and operates to normally urge the piston valve 35 to brake release position, shown in Fig. 1. When the piston valve 35 is in brake release position the front end 32 of the power cylinder communicates with the source of suction through the flexible conduit 31, brake port 29, bore 26 and the manifold port 28, while the rear end 41 of the power cylinder is also connected to the source of suction through the tubular piston rod 13, bore 26 and the manifold port 28 to thereby suspend the piston 12 in vacuum.

The outer end of the piston valve 35 is provided with an axial cavity for the loose reception of one end of a valve rod 43 the opposite end of which is rigidly secured to a yoke 44 carried by a bushing 45 forming part of a lost motion device. A boot 46 has one end seated in a groove around the valve housing and the other end is disposed about the valve stem 43 to exclude extraneous matter from the bore 26.

The lost motion device and lever mechanism for operating the control valve comprises a brake pedal 50 at all times urged to brake release position by a retractor spring 49 and is fulcrumed intermediate its ends about a pin 51 carried by the vehicle and terminates at its upper end in a foot engaging pedal portion 52. The lower end 53 of the brake lever 50 carries the bushing 45 provided with a bore 54 in which is loosely disposed, as shown in Fig. 3, a pin 55 pivotally supported by a pair of power levers 56 arranged on opposite sides of the lower part of the brake lever 50 and are pivotally supported at their upper ends by the fulcrum pin 51. The control valve 25 is carried by an elongated yoke 57 which has its side plates 58 journaled about the valve pin 55 and has its closed end disposed about the tubular piston rod 13 and is secured to the valve housing by means of the nut 59.

In order to connect the hydraulic master cylinder 60 with the power piston rod 13, the brake lever 50 is provided with an opening 61 for the loose reception of a pin 62 which is supported in the opening 61 by connection as at 63 with the power levers 56, and pivotally connected to the pin 62 is the bifurcated end 64 of a piston rod 65 provided with a piston 66 disposed in the hydraulic master cylinder 60. The master cylinder 60 is suspended from the motor vehicle by means of a bracket 66 and is connected to a conduit system 67 not completely shown which leads to the wheel brake cylinders of the vehicle wheels.

From the foregoing it will be seen that the brake pedal 50 is actually a lever having a power arm 70 extending from the fulcrum point 51 to the foot engaging pedal 52, and a weight arm 71 extending from the fulcrum point 51 to the pin 55.

In operation, assume that the parts are in the position shown in Fig. 1, which corresponds to brake release position and the internal combustion engine is operating and creating partial pressure in the intake manifold of the vehicle engine. The piston 12 will be submerged in vacuum since the manifold port 28 is in communication with the tubular piston rod 13 leading to the rear end 41 of the power cylinder 10 and is in communication with the front end 32 of the power cylinder through the flexible conduit 31. When it is desired to apply the brakes, foot pressure is exerted on the foot pedal 52 causing the brake lever 50 to swing counterclockwise about the fulcrum pin 51 and the weight arm 71 to move relative to the hydraulic pin 62 in the aperture 61 and the bushing 45 to move relative to the valve pin 55 which causes the piston valve 35 to move inwardly of the valve housing against the tension of the valve spring 39 to a position wherein the closure valve 37 interrupts communication between the brake port 29 and the manifold port 28 to slightly uncover the brake port 29 to establish communication between the atmosphere and the front end 32 of the power cylinder by way of the atmosphere port 27, annular recess 38, the partially uncovered brake port 29 and the flexible conduit 31. Since the rear end 41 of the power cylinder is at all times in communication with the source of suction, the piston 12 is subject to a differential pressure which causes the piston 12, rigid conduit 13 and yoke 57 to move to the right as viewed in Fig. 1. This movement of the yoke 57 swings to the power levers 56 in a counterclockwise direction about the fulcrum pin 51 to thereby move the hydraulic plunger 66 into the master cylinder 60 to distribute the brake fluid to the wheel brake cylinders and thus apply the brakes.

Movement of the tubular piston rod 13 and yoke 57 effects bodily movement of the control valve to the exclusion of movement between the valve 35 and the control valve housing due to the lost motion slot 54 in the brake pedal lever 50.

If pedal pressure on the brake lever 50 is reduced the retractor spring 49 swings the brake lever 50 in clockwise direction to move the valve 35 to a lap position wherein the valve closure 37 covers the brake port 29 to thereby hold the brakes in applied position without additional exertion on the part of the operator. As soon as pressure on the foot pedal is released, the valve spring 39 will move the valve from lap position to brake release position, whereupon the atmosphere will be cut off and the front end 32 of the power cylinder will be in communication with the source of suction permitting the piston 12 to be returned to normal position and release the brakes under the normal action of the retractor and brake springs.

In a brake application, it will be seen that the greater the pressure exerted on the foot pedal 50, a greater portion of the brake port 29 will be uncovered thereby permitting a more rapid entrance of atmosphere into the front end 32 of the power cylinder with more severe application of the brakes.

Should differential pressure fail to be created in the power cylinder 10 after initial movement of the brake pedal 50, the lost motion pin 62 will be in a position to immediately bottom in the slot 61 in the brake lever so that further movement of the brake lever 50 will force the hydraulic plunger 66 into the master cylinder 60 to apply the brakes solely by the physical force of the operator.

From the foregoing it will be seen that the power lever means 56 which operates the hydraulic piston 66 has a power arm extending from the stud shaft or fulcrum pin 51 to the valve pin 55 and has a weight arm extending from the fulcrum pin 51 to the hydraulic lost motion pin 62. When the brakes are operated solely by the physical force of the operator the brake lever 50 has a power arm extending from the foot pedal 52 to the fulcrum pin 51 and has a weight arm extending from the fulcrum 51 to the hydraulic pin 62. In other words, the brake pedal 50 is a control lever for controlling the valve 25, and the levers 56 are power lever means for transmitting the braking power in the power cylinder 10 to the hydraulic piston 66, and if the source of suction fails the brake lever 50 functions as a mechanical lever to operate the hydraulic piston 66 solely by the physical force of the operator.

Figs. 4 and 5 relate to a different embodiment of the invention and comprises an air suspended power cylinder 80 supported on a vehicle by means of a bracket 81, and is provided with an air cleaner 82 which at all times communicates the rear end 83 of the power cylinder with the atmosphere. The front wall 85 of the power cylinder is punched out to provide a hollow boss 86 for the reception of a packing and bearing member 87 in which is slidably mounted a piston rod 88 connected at one end to a piston 89 disposed in the power cylinder 80. A boot 90 is connected to the packing 87 and to the piston rod 88 to insure an air tight connection therebetween.

A control valve 95 is rigidly secured to the piston rod 88 by means of a bracket 96 mounted on the piston rod 88 by means of pins 97. The control valve 95 comprises a housing having an axial bore 100 communicating with an axial brake port 101 and with lateral ports 102 and 103. A rigid tubular conduit 104 has one end connected to the valve housing in alignment with the brake port 101 and extends through an aperture 105 in the front wall of the power cylinder 80 and into the latter to terminate short of the piston 89, and is supported in fluid tight relation with respect to the aperture 105 by means of a packing 106. The atmosphere port 102 communicates with the atmosphere through a breather or air cleaner 107, and the manifold port 103 is adapted to be connected with the intake manifold of an internal combustion engine for the source of suction or partial vacuum.

Reciprocally mounted in the bore 100 is a piston type valve 108 having an annular closure valve member 109 and spaced therefrom is a cup shaped valve 110, the wall portion of which normally covers the vacuum port 103. The spaced apart valve members 109 and 110 define an annular recess 111 which communicates with spaced apertures 112 in the bottom of the cup shaped valve 110. A valve spring 113 is interposed between the closure valve 110 and a shoulder formed by a reduction of the bore 100 and operates to normally urge the piston valve 108 to brake release position shown in Fig. 4. When the control valve is in brake release position the power piston 89 is suspended in air since the rear end 83 of the power cylinder communicates with the atmosphere through the breather 82 and the front end 114 of the power cylinder communicates with the atmosphere through the rigid conduit 104, bore 100, air port 102 and the breather 107.

The outer end of the piston valve 108 is provided with an axial cavity for the loose reception of one end of a valve rod 115 the opposite end of which is connected to a lever 116 of a lost motion device hereinafter described. A boot 117 has one end seated about the valve housing and the other end about the valve stem 115 to exclude foreign matter from the bore 100.

The lost motion and lever mechanism for operating the control valve 95 comprises a pair of supporting or carrier plates 120 rigidly connected by the pins 97 to the piston rod 88 and carry a fulcrum pin 121 to pivotally support the lever 116 intermediate its end, the lower end 122 of which is pivotally connected by a pin 123 to one end of spaced links 124 having their opposite ends pivoted on a bushing 125 rigidly carried by an arm or projection 126 of a brake pedal lever 127 fulcrumed at its lower end about a stub shaft 128 supported by the motor vehicle and the brake lever is provided at its opposite end with a foot engaging pedal 129. A retractor spring 130 urges the parts to brake release position shown in Fig. 4.

Power lever means for transmitting the operative movements of the power piston 89 to the brakes are provided and comprise a pair of spaced lever plates 135 pivotally connected to a pin 131 carried by the supporting plates 120 and are fulcrumed about the stub shaft 128. Each of the levers 135 have a pair of oppositely extending lever arms 136 and 137 joined together at their outer ends by pins 138 and 139 which pivotally support a pair of spaced links 140 pivotally connected to a lever 142 rigidly secured at 143 to a tubular cross shaft 144 suitably journaled on the vehicle. The lever arms 137 of the power levers 135 may be disposed at such an angle with respect to the stub shaft 128 so as to place the pivot pin 139 intermediate the stub shaft 128 and the other pivot pin 131. Keyed to the cross shaft 144 are a pair of brake levers 145 each pivotally connected at their outer ends to brake cables 147 leading to the front and rear brakes of the vehicle.

In operation assume that the brake is in brake release position shown in Fig. 4 and the internal combustion engine is operating and creating partial pressure in the intake manifold of the vehicle engine. The power piston 89 is submerged in atmosphere since the valve air port 102 is in communication with the rigid conduit 104 leading to the front end 114 of the power cylinder, and the breather 82 exposes the rear end 83 of the power cylinder to the atmosphere. When it is desired to apply the brakes by power, the operator slightly depresses the brake lever 127. This movement swings the brake lever 127 about its fulcrum 128 and causes the brake arm 126 and links 124 to move relatively to the lost motion pin 131, due to the large diameter of the opening in the bushing 125 with respect to the lost motion pin 131, whereby the valve lever 116 will push the valve 108 inwardly of the valve housing against the tension of the spring 113 to close the atmosphere port 102 and slightly uncover the vacuum port 103. This sets up a partial vacuum at the front end 114 of the power cylinder 80 since the latter is now in communication with the intake manifold by way of the vacuum port 103, bore 100 and rigid conduit 104. With atmospheric pressure on the opposite side of the piston 89, a differential pressure is exerted thereon and causes the piston 89 to move to the left as viewed in Fig. 4. This movement of the piston causes bodily movement of the supporting plates 120 and lost motion pin 131 with respect to the slot 130 in the brake pedal arm 126 and swings the power levers 135 in a counterclockwise direction about the stud shaft 128 to thereby rotate the cross shaft 144 and cable levers 145 to effect braking movement of the brake cables 147 to thus apply the brakes. Movement of the piston 89 and carrier plates 120 effects bodily movement of the rigid conduit 104 with respect to the power cylinder 80 and also bodily movement of the control valve 95 to the exclusion of any movement between the valve 108 and the control valve housing due to the lost motion slot 130 in the brake arm 126.

If the foot pressure on the pedal 129 is reduced the retractor spring 130 swings the brake lever 127 in clockwise direction thereby swinging the valve lever 116 in counterclockwise direction to move the valve 110 to lap position wherein the valve 110 covers the vacuum port 103 and the atmosphere port 102 to thereby hold the brakes in applied position without additional exertion on the part of the operator. As soon as pressure is removed from the foot pedal, the valve spring 113 moves the valve from lap position to brake release position shown in Fig. 4, whereupon the source of suction will be cut off and atmospheric pressure will enter the port 102 and rigid conduit 104 and thence into the front end 114 of the power cylinder permitting the piston therein to be returned to normal position and release the brakes under the normal action of the retractor spring 130.

In a brake application, it will be seen that the greater pressure exerted on the foot pedal 129, a greater portion of the vacuum port 103 will be uncovered thereby permitting a more rapid creation of vacuum in the front end 114 of the power cylinder with consequent more severe application of the brakes.

The manual operation of the brakes follows the power application so that should the source of suction fail the lost motion pin 131 is in a position to immediately bottom in the slot 130 in the brake arm 126 so that further movement of the brake lever 127 will swing the power levers 135 in a counterclockwise direction to operate the links 140 and lever 142 to manually operate the cross shaft 144 and cable levers 145 and consequently the wheel brakes through the cable 147.

It will be understood that various changes in the construction and arrangement of parts may be resorted to without departing from the scope of the appended claims.

I claim:

1. In a braking apparatus, brake applying mechanism, a power chamber having a pressure responsive member therein, a rod for said pressure responsive member and operable to effect operation of said brake applying mechanism, a valve housing mounted on said rod outside of said power chamber, a rigid conduit slidably disposed in an end wall of said power chamber and terminating a fixed distance short of said pressure responsive member, a control valve in said valve housing for controlling communication of brake actuating fluid through said rigid conduit to said power chamber, and operator operated means for controlling operation of said control valve.

2. In a braking apparatus, brake applying mechanism, a power device having a pressure responsive device, a piston rod for said pressure responsive device operable to effect operation of said brake applying mechanism, a valve housing mounted on said piston rod outside of said power device, a rigid conduit slidably disposed in an end wall of said power device and terminating a fixed distance short of said pressure responsive device, a control valve in said valve housing for controlling communication of the brake actuating fluid through said rigid conduit to said power device, a valve operating lever mounted upon said rod, a foot pedal, and means connecting the lever and pedal and having a lost motion connection with said piston rod.

HAROLD R. FITZGERALD.